United States Patent [19]

Runciman et al.

[11] 4,082,416
[45] Apr. 4, 1978

[54] RADIATION SCANNING SYSTEM WITH TWO SCANNERS ROTATING ABOUT PARALLEL AXES

[75] Inventors: Herbert Morrison Runciman; Peter John Berry, both of Glasgow, Scotland

[73] Assignee: Barr & Stroud Limited, Glasgow, Scotland

[21] Appl. No.: 748,327

[22] Filed: Dec. 7, 1976

[30] Foreign Application Priority Data

Dec. 13, 1975  United Kingdom ............... 51154/75

[51] Int. Cl.² ............................................. G02B 27/17
[52] U.S. Cl. ........................................ 350/6.8; 250/236
[58] Field of Search ............... 350/7, 6, 285; 250/236; 358/206

[56] References Cited

U.S. PATENT DOCUMENTS

| | | | |
|---|---|---|---|
| 3,604,932 | 9/1971 | Beach | 350/7 |
| 3,845,298 | 10/1974 | Runciman | 350/7 |
| 3,956,585 | 5/1976 | Ullstig | 250/236 |

FOREIGN PATENT DOCUMENTS

| | | | |
|---|---|---|---|
| 2,212,545 | 9/1972 | Germany | 358/206 |
| 1,393,535 | 5/1975 | United Kingdom | 350/7 |

Primary Examiner—Jon W. Henry
Attorney, Agent, or Firm—Mason, Fenwick & Lawrence

[57] ABSTRACT

A radiation scanning system having a radiation detector which receives radiation from a focussing system after reflection from first and second scanners which are rotatable about parallel axes, and in which the first scanner is annular having its reflective surfaces on its outer periphery, the rotational axis of the second scanner being displaced by a distance which is less than the radius of the second scanner from the plane containing the rotational axis of the first scanner and the axis of the radiation focussing system.

5 Claims, 7 Drawing Figures

RADIATION SCANNING SYSTEM WITH TWO SCANNERS ROTATING ABOUT PARALLEL AXES

This invention relates to apparatus for use in a radiation scanning system and in particular to a modification of or addition to one form of the apparatus which is disclosed in U.S. Pat. No. 4,037,920. U.S. Pat. No. 4,037,920 there is disclosed inter alia, apparatus for use in a radiation scanning system, comprising a radiation detector and optical means which is arranged to scan radiation from a field of view across the detector, the optical means including a radiation focussing system, a first drum carrying a first set of reflective surfaces, the first drum being rotatable about a first axis, a second drum carrying a second set of reflective surfaces, the second drum being rotatable about a second axis parallel to said first axis, the drums being so dimensioned and located with respect to the detector that radiation transmitted by said focussing system is permitted to enter the detector after sequential reflection from reflective surfaces of said two sets of planar reflective surfaces in a manner which is independent of the position of the radiation in the field of view. Such apparatus will be referred to hereinafter as "apparatus to the kind aforesaid".

The present invention provides apparatus of the kind aforesaid wherein the first drum is annular and the first set of reflective surfaces is mounted on the inner periphery thereof, the second drum is peripherally bounded by the first drum and the second set of reflective surfaces is mounted around the second drum, the reflective surfaces forming the first set are each in the form of a pair of planar reflective members inclined at substantially right angles to each other, the line of intersection of the planes containing said pair of planar reflective members being disposed at right angles to said axes of rotation, the reflective surfaces forming the second set are each planar and parallel to said axes of rotation, and the axis of the second drum is displaced by a distance which is less than the radius of the second drum from the plane containing the first axis of rotation and the axis of the radiation focussing system.

Embodiments of the present invention will now be described by way of example with reference to the accompanying drawings, in which.

Figure 1:
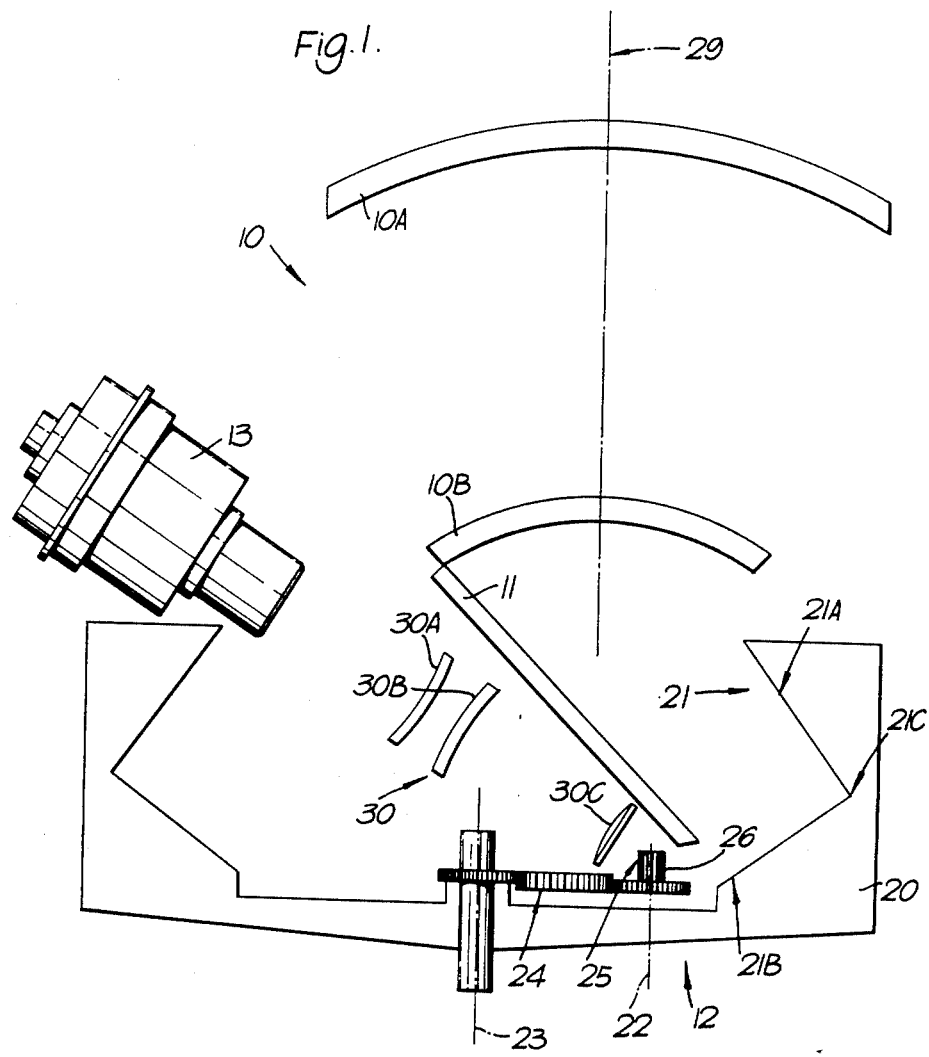
FIGS. 1 and 2 illustrate components of a first embodiment of the present invention.
Figure 2:
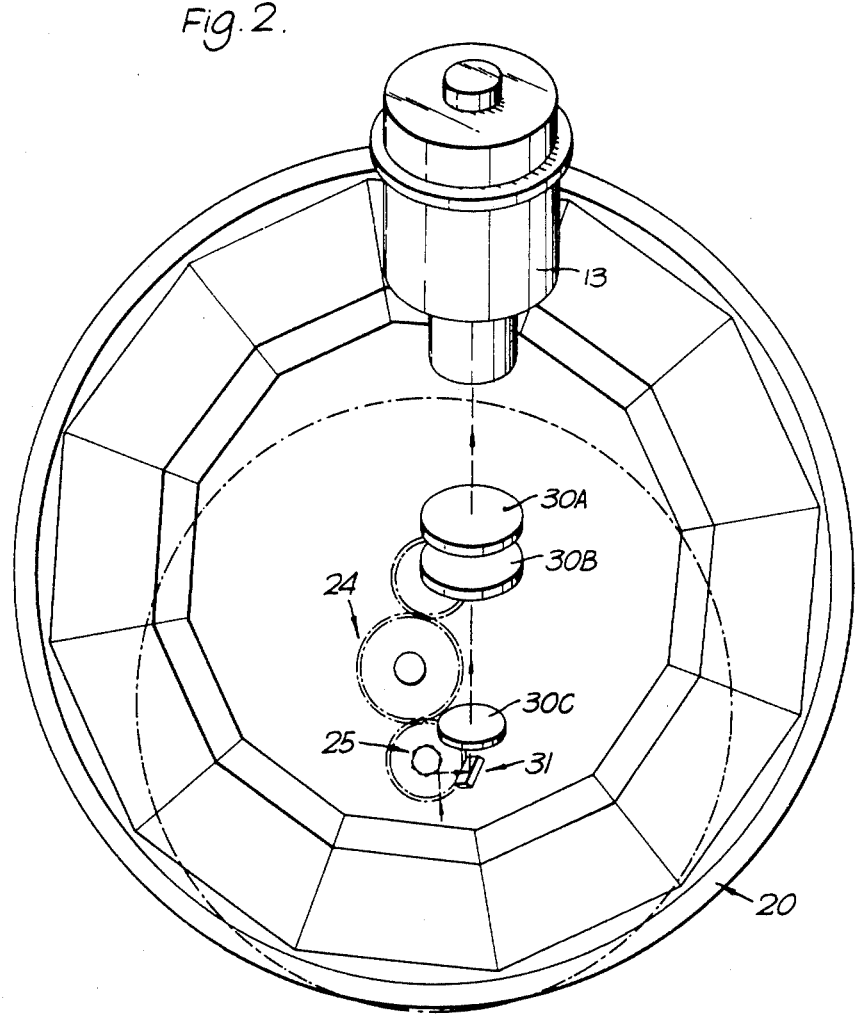
Figure 3:
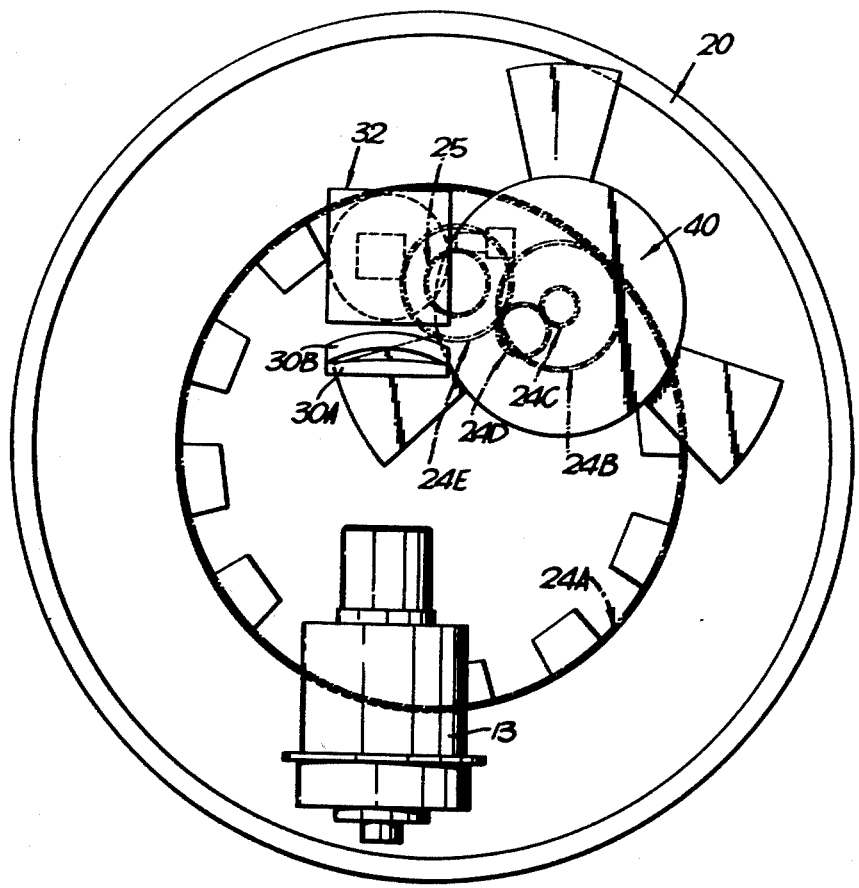
FIGS. 3, 4 and 5 illustrate components of a second embodiment.
Figure 4:
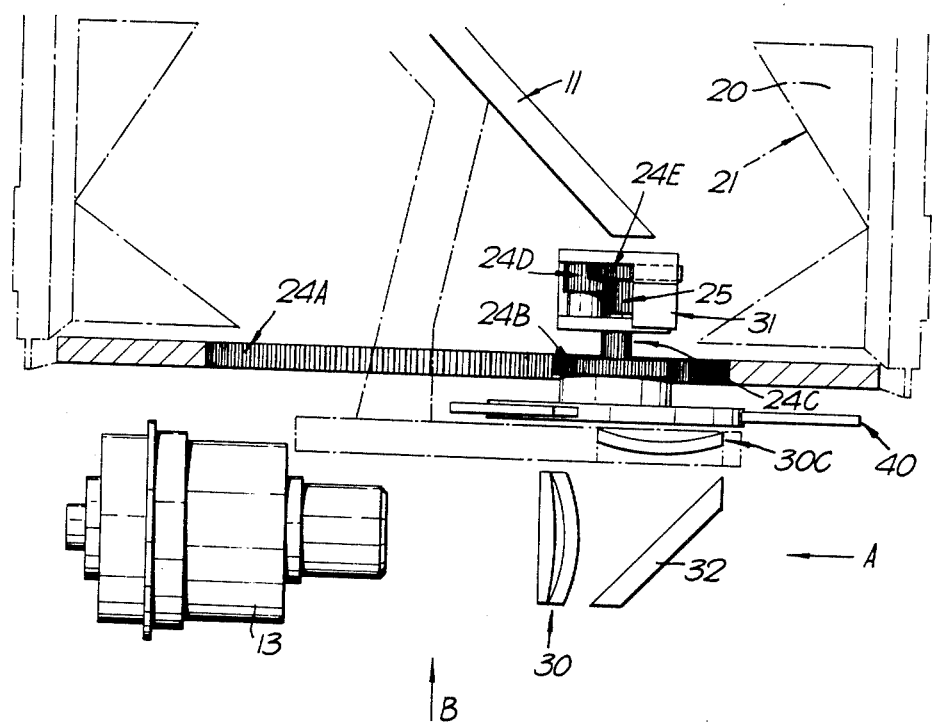
Figure 5:
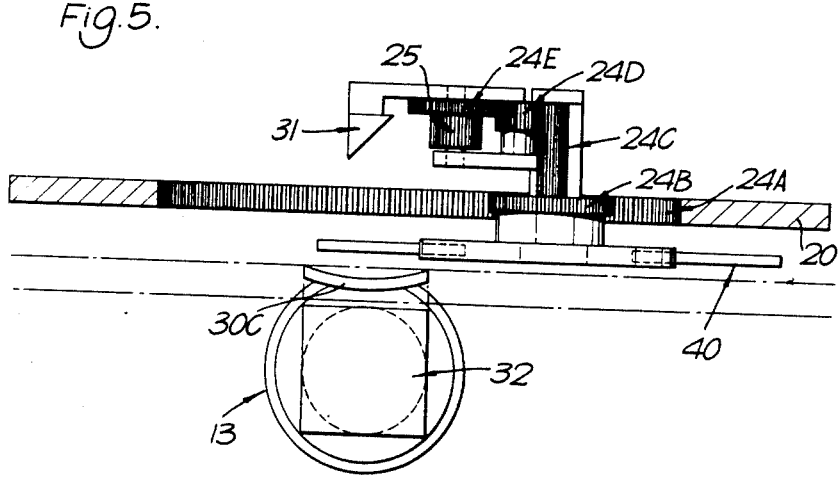
Figure 6:
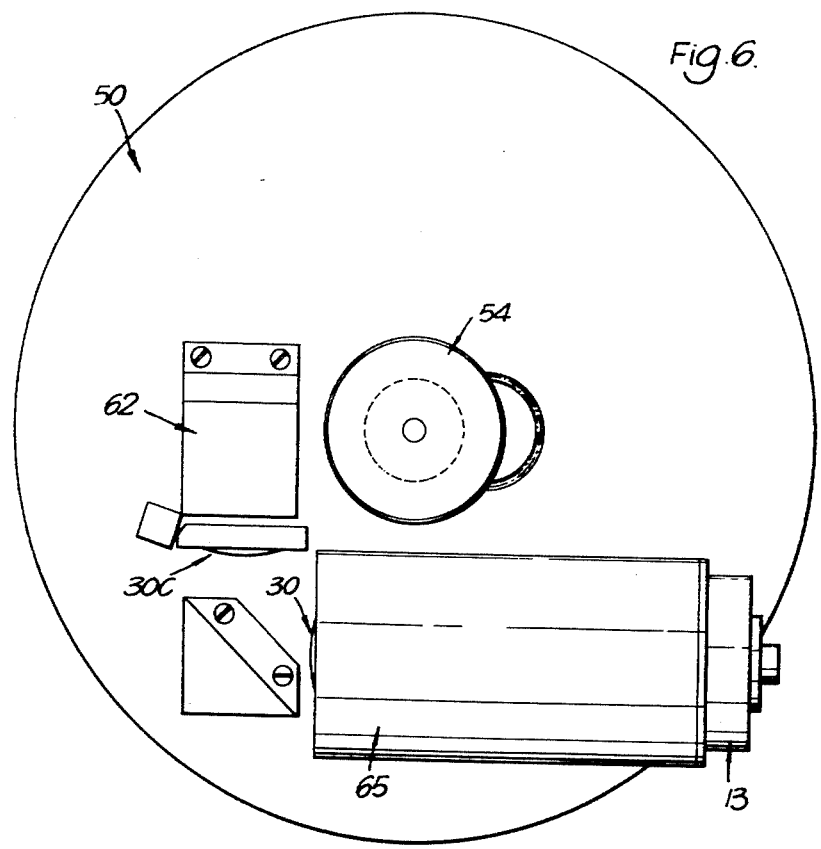
Figure 7:
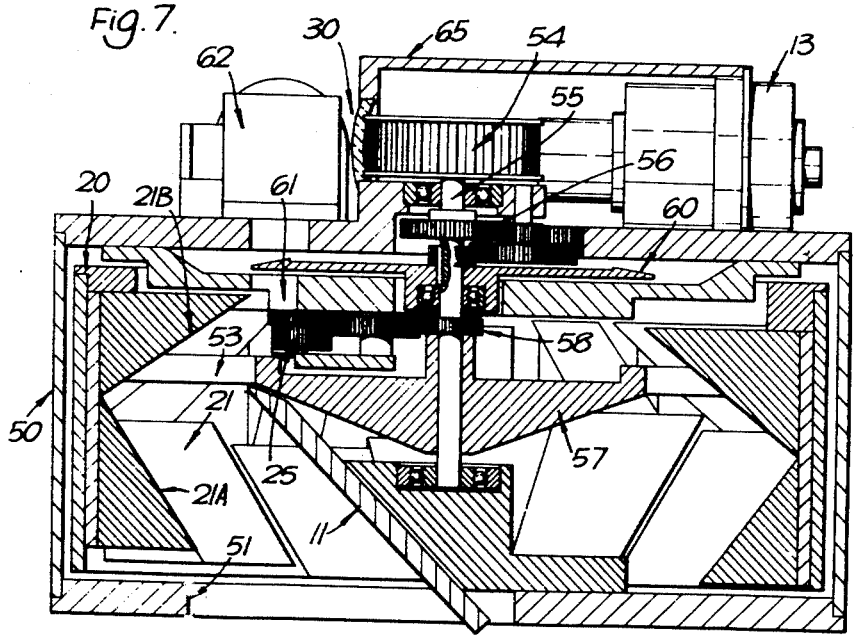

FIG. 5 being a view of FIG. 4 taken in the direction of the arrow A in FIG. 4 and FIG. 3 being in view taken in the direction of the arrow B of FIG. 4; and FIGS. 6 and 7 are top plan and sectional elevation views respectively of a third embodiment of the present invention In the first embodiment shown in FIGS. 1 and 2 radiation from a field of view is focussed by a system 10 formed by lens elements 10A, 10B and reflected from a planar reflector 11 to be scanned by an optical means 12 onto a detector 13. The means 12 comprises a first drum 20 which is annular and around the inner periphery there is located a first set of reflective surfaces 21 (only two of which are shown in the interests of clarity) each formed by two planar reflective members 21A, 21B inclined at substantially right angles to each other. The drum 20 is rotated by a motor (not shown) about an axis 23 and by means of a gear train 24, rotates a second drum 25 about an axis 22, the drum 25 having a second set of reflective surfaces 26 around its periphery. Each of the surfaces 26 is planar and parallel to the axis 22, 23 and the drum 25 lies within the periphery of the drum 20. The reflective members 21A, 21B intersect in a line 21C which is at right angles to the axis 23 and the axis 22 is offset from the plane containing the axis 23 and the axis 29 of the lens system 10 by an amount which is less than the radius of the drum 25 so that radiation entering the apparatus centred on the axis 29 is reflected from members 21A, 21B and a surface 26 into the detector 13 without obscuration by way of a fixed mirror 31 (shown only in FIG. 2 in the interests of clarity) and a relay lens system 30 having elements 30A, 30B and 30C. The lens system 10 focusses the incident radiation substantially on the surface of the drum 25 and the lens system 30 relays the focussed radiation to the detector 13.

FIG. 2 is a view of the apparatus of FIG. 1 with the components 10A, 10B and 11 omitted in the interests of clarity.

In the second embodiment which is illustrated in FIGS. 3, 4 and 5 the detector 13 is located on the side of the drum 20 opposite that which receives radiation and radiation entering the detector 13 is intermittently intercepted by an intercepter 40 to provide a reference signal FIG. 5 is a view of FIG. 4 taken in the direction of the arrow A and with components 11 and 20 omitted in the interests of clarity. A fold mirror 32 is located between lens elements 30B and 30C of the relay lens system 30. In this embodiment the gear train 24 comprises a ring gear 24A mounted on the drum 20 and engaging a gear 24B secured to the spindle on which the interceptor 40 is mounted. Secured to the same spindle is a gear 24C which drives an idler gear 24D which in turn drives a gear 24E secured to the spindle on which the drum 25 is mounted.

In the third embodiment illustrated in FIGS. 6 and 7 the drum 20 is mounted within a casing 50 which has an aperture 51 through which radiation from the focussing system 10 (not shown) is incident upon the planar reflector 11. The reflective surfaces 21 are circumferentially spaced apart and the drum 20 carries an apertured flange incorporating a ring gear 53 to permit the drum to be rotated. The apertures in the flange permit radiation to be reflected from the member 21A to the member 21B. A motor 54 mounted on the casing 50 drives a splindle 55 carrying a first gear 56 which drives an intercepter 60 by way of a gear train, a second gear 57 which drives the ring gear 53 and a third gear 58 which drives the drum 25 by means of a gear train. Radiation reflected from the drum 25 is reflected from a planar reflector (not shown) through an aperture 61 in the casing 50 to a further planar reflector 62 and into the detector 13 through the focussing system 30. The detector 13 and parts of the system 30 are located within a housing 65 secured to the casing 50.

In each of the embodiments which has been described the radiation from the field of view is focussed upon the surface of the drum 25 by the focussing system 10 and the axis of rotation of the drum 25 is displaced from the plane of the incident radiation by an amount which is less than the radius of the drum 25. The reflective surfaces 21 of the drum 20 each have two mutually perpendicular planar reflective members whose lines of intersection are each perpendicular to the axis of rotation of the drum 20. The reflective surfaces 26 of the drum 25 are each parallel to the axis of rotation of that drum which in turn is parallel to the axis of rotation of the drum 20. The focussed rotation at the surface of the drum 20 is relayed onto the detector 13 by the relay lens system 30 and this permits good switching between successive frames of detected radiation. It can be shown that provided the drum 25 is fairly small (e.g. 1 cm in diameter) the off-axis positioning of the drum 25 does not cause any significant distortion and substantially telecentric scanning is achieved.

The members 21A and 21B forming each of the reflective surfaces 21 may be in the form of mirrors or prisms may be used, and in order to obtain scan in the secondary direction the surfaces 21 may be positioned to provide that the various lines 21C are displaced axially in the direction of the axis of rotation 23 from one surface 21 to another as is described in U.K. patent specification No. 1399706.

Although to achieve a substantially distortion free scan the members 21A and 21B should be mutually perpendicular it is not required that the members 21A and 21B each lie at 45° to the axis of rotation 23 and likewise the reflector 11 need not lie at the angle illustrated in FIG. 1 and some advantages may be found in selecting different orientations.

What is claimed is:

1. Apparatus for use in a radiation scanning system, comprising a radiation detector and optical means which is arranged to scan radiation from a field of view across the detector, the optical means including a radiation focussing system, a first drum carrying a first set of reflective surfaces, the first drum being rotatable about a first axis, a second drum carrying a second set of reflective surfaces, the second drum being rotatable about a second axis parallel to said first axis, the drums being so dimensioned and located with respect to the detector that radiation transmitted by said focussing system is permitted to enter the detector after sequential reflection from reflective surfaces of said two sets of planar reflective surfaces in a manner which is independent of the position of the radiation in the field of view, wherein the first drum is annular and the first set of reflective surfaces is mounted on the inner periphery thereof, the second drum is peripherally bounded by the first drum and the second set of reflective surfaces is mounted around the second drum, the reflective surfaces forming the first set are each in the form of a pair of planar reflective members inclined at substantially right angles to each other the line of intersection of the planes containing said pair of planar reflective members being disposed at right angles to said axes of rotation, the reflective surfaces forming the second set are each planar and parallel to said axes of rotation, and the axis of the second drum is displaced by a distance which is less than the radius of the second drum from the plane containing the first axis of rotation and the axis of the radiation focussing system.

2. Apparatus according to claim 1, wherein the planar reflective members are in the form of mirrors.

3. Apparatus according to claim 1, wherein the planar reflective members are mounted on prisms.

4. Apparatus according to claim 1, wherein the various said lines of intersection are displaced in the direction of the axis of rotation of the first drum from one reflective surface to another around the first drum so as to achieve scanning in a secondary direction.

5. Apparatus for use in a radiation scanning system comprising an objective device forming convergent radiation from a field of view, a radiation detector, and an optical scan means which is arranged to scan convergent radiation from said field of view across said detector, said scan means comprising an annular first drum which is rotatable about a first axis, a first set of optical members mounted on the inner periphery of said first drum and defining a set of pairs of first planar reflective surfaces the surfaces of each pair being inclined substantially at right angles to each other with the respective lines of intersection of the planes containing the reflective surfaces of each pair being disposed at right angles to said first axis, a second drum which is rotatable about a second axis extending parallel to and spaced from said first axis, a second set of optical members mounted on said second drum and defining a set of second planar reflective surfaces each of which extends perpendicular to a radius of said second drum, drive means rotating said first drum sequentially to move each of said pairs of first reflective surfaces through a first reflector station, and rotating said second drum sequentially to move each of said second reflective surfaces through a second reflector station, said scan means being arranged with the second axis displaced by a distance which is less than the radius of the second drum from the plane containing the first axis and the axis of the objective device, whereby when the respective reflective surfaces are in said first and second reflector stations convergent radiation from said field of view enters said detector after sequential reflection by the two reflective surfaces at said first reflector station and by the single reflective surface at the second reflector station.

* * * * *